United States Patent
Tokura et al.

(10) Patent No.: US 7,546,387 B2
(45) Date of Patent: Jun. 9, 2009

(54) APPARATUS, METHOD AND COMPUTER PROGRAM PRODUCT FOR EXECUTING COMMAND

(75) Inventors: Seiji Tokura, Kanagawa (JP); Hisashi Hayashi, Kanagawa (JP); Yasuhiko Suzuki, Tokyo (JP); Fumio Ozaki, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 459 days.

(21) Appl. No.: 11/368,386

(22) Filed: Mar. 7, 2006

(65) Prior Publication Data

US 2006/0282559 A1 Dec. 14, 2006

(30) Foreign Application Priority Data

May 26, 2005 (JP) .............................. 2005-154390

(51) Int. Cl.
*G06F 3/00* (2006.01)
(52) U.S. Cl. ............................... 710/5; 710/32; 700/245
(58) Field of Classification Search ........................ None
See application file for complete search history.

(56) References Cited

U.S. PATENT DOCUMENTS

2003/0046324 A1* 3/2003 Suzuki et al. ............... 709/100

2007/0173228 A1* 7/2007 Funnell et al. ............... 455/410

FOREIGN PATENT DOCUMENTS

JP 2000-35815 2/2000
JP 2002-373008 12/2002

OTHER PUBLICATIONS

U.S. Appl. No. 11/213,891, filed Aug. 30, 2005, Hisashi Hayashi.
U.S. Appl. No. 11/368,386, filed Mar. 7, 2006, Tokura et al.
U.S. Appl. No. 11/497,336, filed Aug. 2, 2006, Ozaki et al.

* cited by examiner

*Primary Examiner*—Eron J Sorrell
(74) *Attorney, Agent, or Firm*—Oblon, Spivak, McClelland, Maier & Neustadt, P.C.

(57) ABSTRACT

A command executing apparatus includes an executing unit that executes a command indicating process contents of a robot; a suspending unit that suspends execution of the command, when an interrupt command; a resumption condition generating unit that generates a resumption condition for resuming a suspending command; an executed contents generating unit that generates executed contents indicating the process contents executed until the suspending command is suspended; a suspending state holding unit that holds the resumption command and the executed contents in association with the suspending command; a resumption propriety judging unit that judges whether the suspending command is able to be resumed, when the resumption command is obtained; and a resuming unit that indicates the executing unit that the execution of the suspending command is resumed from a point at which the suspending command is suspended, when the suspending command is judged to be able to be resumed.

9 Claims, 10 Drawing Sheets

FIG.2

| COMMAND NAME | STATE VARIABLE | COMMAND CONTENTS |
|---|---|---|
| Suspend() | | SUSPENSION OF command IN EXECUTION |
| delSuspendAll () | | DELETE SUSPENDING HOLDING CONDITION, SUSPENDING STATE, AND SUSPENDING COMMAND |
| delSuspend (command, argument) | | IF command IS SUSPENDING, DELETE HOLDING CONDITION OF command, SUSPENDING COMMAND, AND SUSPENDING STATE |
| explain (explanatory_position, explanatory_sentence) | NUMBER OF SENTENCES EXPLAINED | EXPLAIN EXPLANATORY SENTENCE AT PREDETERMINED EXPLANATORY POSITION |
| move (position) | CURRENT COORDINATE, PLANNED PATH | MOVE TO POSITION |
| move (position, coordinate x, path) | CURRENT COORDINATE, PLANNED PATH | MOVE TO POSITION THROUGH PATH USING COORDINATE x AS CURRENT COORDINATE OF AN INTERNAL STATE |
| moveArc (angle, R) | CURRENT ANGLE | ROTATE TRACING ARC R |
| moveStraight (distance) | CURRENT DISTANCE | MOVE BY DISTANCE |
| moveArm (arm_coordinate) | CURRENT ARM COORDINATE, PLANNED PATH | MOVE ARM TO ARM COORDINATE |
| speak (character_string) | NUMBER OF SENTENCES SPOKEN | SPEAK CHARACTER STRING |
| wait (time) | SECONDS WAITED | SLEEP BY TIME |
| . . . | . . . | . . . |

FIG.3

| COMMAND NAME | DELETE CONDITION1 | DELETE CONDITION2 | DELETE CONDITION3 | DELETE CONDITION4 | DELETE CONDITION5 | DELETE CONDITION6 | ... |
|---|---|---|---|---|---|---|---|
| explain(A,an) | move(*) | moveArc(*) | moveStraight(*) | explain(B,bn) | delSuspendAll() | delSuspend(explain,A) | ... |
| explain(B,bn) | move(*) | moveArc(*) | moveStraight(*) | explain(A,an) | delSuspendAll() | delSuspend(explain,B) | |
| move(*) | move(*) | moveArc(*) | moveStraight(*) | | delSuspendAll() | delSuspend(move) | ... |
| moveArc(*) | move(*) | moveArc(*) | moveStraight(*) | | delSuspendAll() | delSuspend(move) | ... |
| moveStraight(*) | move(*) | moveArc(*) | moveStraight(*) | | delSuspendAll() | delSuspend(move) | ... |
| moveArm(*) | move(*) | | | | delSuspendAll() | delSuspend(moveArm) | |
| AnswerForQ(*) | * | | | | | | |
| wait(*) | * | | | | ... | | |
| ... | ... | ... | ... | ... | | | |

FIG.4

| COMMAND NAME | DELETE CONDITION 1 | DELETE CONDITION 2 | DELETE CONDITION 3 | DELETE CONDITION 4 | DELETE CONDITION 5 | DELETE CONDITION 6 | EXECUTED CONTENTS1 | EXECUTED CONTENTS2 |
|---|---|---|---|---|---|---|---|---|
| explain (A,an) | move (*) | moveArc (*) | moveStraight (*) | explain (B,bn) | delSuspend All() | delSuspend (explain,A,an) | EXPLAINED UP TO a3 | |
| moveStraight (*) | move (*) | moveArc (*) | moveStraight (*) | | delSuspend All() | delSuspend (move) | MOVED BY 4/5 | |
| ... | ... | ... | ... | ... | ... | ... | ... | ... |

FIG.5

| COMMAND NAME | EXECUTED CONTENTS1 | EXECUTED CONTENTS2 | RESUMPTION COMMAND1 | RESUMPTION COMMAND2 |
|---|---|---|---|---|
| explain(A,an) | EXPLAINED UP TO ax | | Speak ("CONTINUATION OF PREVIOUS SPEECH") | explain(A,a(x+1)~an) |
| ... | ... | | ... | ... |
| moveStraight(*) | MOVED BY y | | moveStraight(1-y) | |
| move(B) | COORDINATE (x, y) | REMAINING PATH α | move(B,(x,y),α) | |
| ... | ... | | ... | ... |

FIG.8

| ORDER OF ACQUISITION | OBTAINED TIMING | OBTAINED COMMAND | COMMAND CONTENTS |
|---|---|---|---|
| 1 | | explain(A,an) | EXPLAIN EXPLANATORY SENTENCES FROM "a1" TO "an" AT POSITION A |
| 2 | WHILE EXPLAINING a4 | suspend() | INSTRUCTION OF SUSPENSION |
| 3 | AFTER INPUTTING PREVIOUS COMMAND | speak(answer) | ANSWER QUESTION |
| 4 | AFTER INPUTTING PREVIOUS COMMAND | explain(A,an) | EXPLAIN EXPLANATORY SENTENCES FROM "a1" TO "an" AT POSITION A |
| 5 | WHILE EXPLAINING a9 | suspend() | SUSPEND |
| 6 | AFTER INPUTTING PREVIOUS COMMAND | move(B) | MOVE TO B |

FIG.9

| ORDER OF ACQUISITION | OBTAINING TIMING | OBTAINING COMMAND | COMMAND CONTENTS |
|---|---|---|---|
| 1 | | move(B) | MOVE TO B |
| 2 | COORDINATE (X, Y), PLANNED REMAINING PATH α | suspend() | INSTRUCTION OF SUSPENSION |
| 3 | | wait(T) | sleep |
| 4 | AFTER t SECONDS HAVE ELAPSED | suspend() | INSTRUCTION OF SUSPENSION |
| 5 | | move(B) | MOVE TO B |

APPARATUS, METHOD AND COMPUTER PROGRAM PRODUCT FOR EXECUTING COMMAND

CROSS-REFERENCE TO RELATED APPLICATIONS

This application is based upon and claims the benefit of priority from the prior Japanese Patent Application No. 2005-154390, filed on May 26, 2005; the entire contents of which are incorporated herein by reference.

BACKGROUND OF THE INVENTION

1. Field of the Invention

The present invention relates to an apparatus, a method, and a computer program product for executing a command indicating process contents of a robot, a command executing method, and a command executing program.

2. Description of the Related Art

Conventionally, in the command executing apparatus, when execution of a command in execution is suspended, and then the command which is in execution is to be executed, it is necessary to execute the command in execution from a beginning thereof. The command executing apparatus, which resumes the execution of the command from a point at which the execution is suspended, is also known (for example, see Japanese Patent Application Laid-Open No. 2000-35815).

However, when a command is resumed, there exists a command that is appropriately executed from a beginning thereof depending of a type of a suspending command. Further there exists also the command which is appropriately resumed from a point at which the command is suspended. In addition, there exists a case in which the command is appropriately executed from the beginning thereof, and a case in which the command is resumed from the point at which the command is suspended, according to a state in which the command is suspended.

Therefore, a resumption point of the command is preferably changes according to the command and an executing state thereof.

SUMMARY OF THE INVENTION

According to one aspect of the present invention, a command executing apparatus includes a command obtaining unit that obtains a command indicating process contents of a robot; an executing unit that executes the command; a suspending unit that suspends execution of the command, when an interrupt command indicating suspension of the execution of the command being executed by the executing unit is obtained; a resumption condition generating unit that generates a resumption condition for resuming a suspending command based on the suspending command, which is the command suspended by the suspending unit; an executed contents generating unit that generates executed contents which is information indicating the process contents executed until the suspending command is suspended; a suspending state holding unit that holds the resumption command and the executed contents in association with the suspending command; a resumption propriety judging unit that judges whether the suspending command is able to be resumed, based on the command obtained by the command obtaining unit from a point at which the execution of suspending command is suspended to a point at which a resumption command is obtained and the resumption condition held by the suspending state holding unit, when the resumption command indicating resumption of the suspending command is obtained; and a resuming unit that indicates the executing unit that the execution of the suspending command is resumed from the point at which the suspending command is suspended, when the suspending command is judged to be able to be resumed.

According to another aspect of the present invention, a command executing method includes obtaining a command indicating process contents of a robot; executing the command; suspending execution of the command, when an interrupt command indicating suspension of execution of the command in execution is obtained; generating a resumption condition for resuming an suspending command based on the suspending command which is the command suspended; generating executed contents which is information indicating process contents executed until the suspending command is suspended; holding in a suspending state holding unit the resumption condition and the executed contents in association with the suspending command; judging whether the suspending command held by the suspending state holding unit is to be able to be resumed based on the command obtained from a point at which execution of the suspending command is suspended to a point at which the resumption condition is obtained and the resumption condition held by the suspending state holding unit, when the resumption command indicating resumption of the suspending command is obtained; and resuming the execution of the suspending command from the point at which the suspending command is suspended, when the command is judged to be able to be resumed.

According to still another aspect of the present invention, a computer program product causes a computer to perform the method according to the present invention.

BRIEF DESCRIPTION OF THE DRAWINGS

FIG. 2 shows examples of a command name obtained by a command executing unit;

FIG. 3 shows a data structure of a delete condition table held in a delete condition holding unit;

FIG. 4 shows a data structure of a suspending command DB;

FIG. 5 shows a data structure of a resumption command table held in a resumption command holding unit;

FIG. 8 shows an example of an obtained command;

FIG. 9 shows an example of an obtained command; and

DETAILED DESCRIPTION OF THE INVENTION

Exemplary embodiments of a command executing apparatus, a command executing method, and a command executing program of the present invention will be described in detail below with reference to the accompanying drawings. It should be understood that the present invention is not limited to the embodiments.

Figure 1:
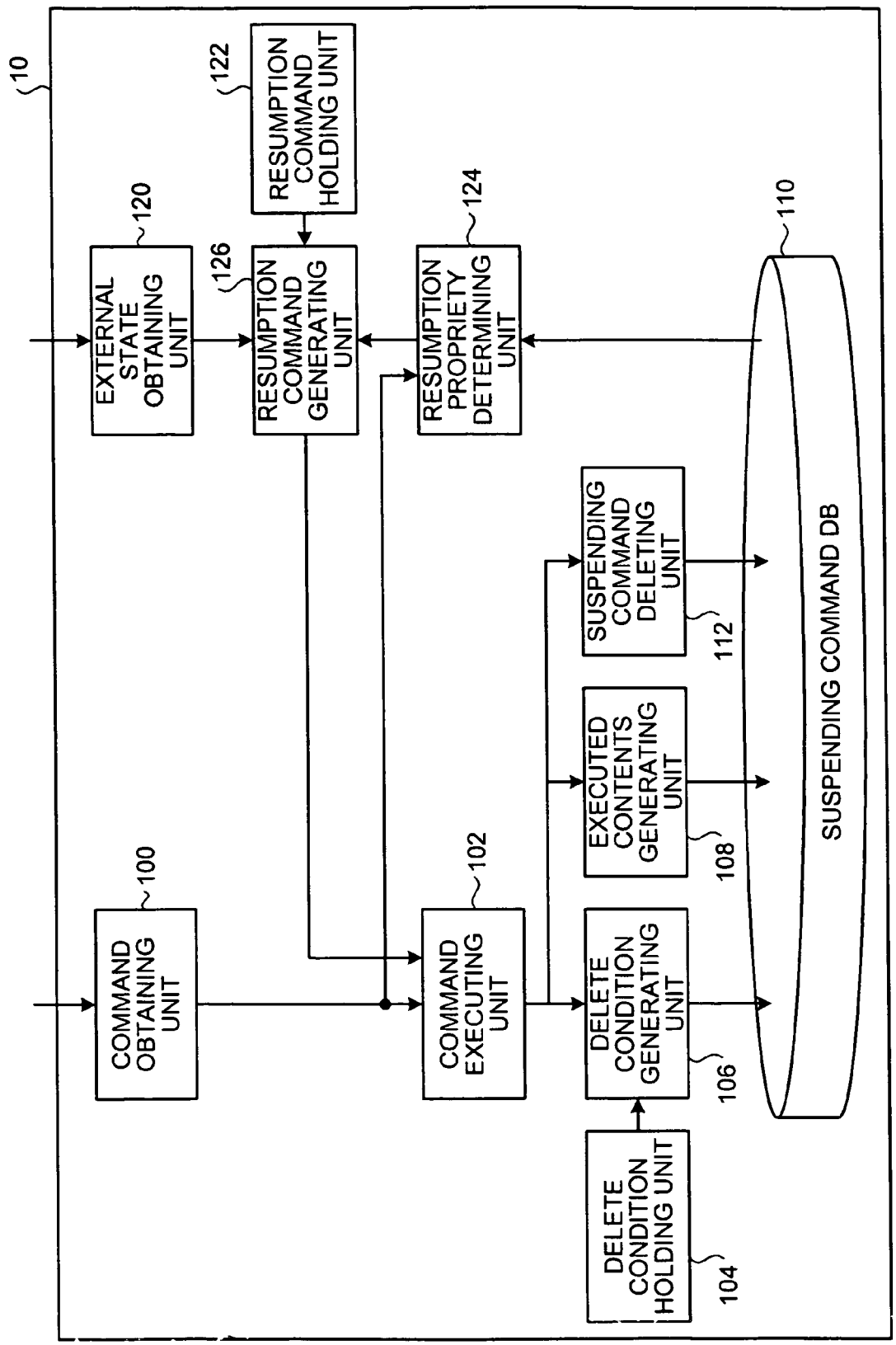
FIG. 1 is a block diagram of a command executing apparatus according to an embodiment.

FIG. 1 is a block diagram of a command executing apparatus 10 according to an embodiment. The command executing apparatus 10 according to this embodiment executes a command indicating process contents to a mobile robot.

The command executing apparatus 10 comprises a command obtaining unit 100, a command executing unit 102, a delete condition holding unit 104, a delete condition generating unit 106, an executed contents generating unit 108, a suspending command database (DB) 110, a suspending command deleting unit 112, an external state obtaining unit 120, a resumption command holding unit 122, a resumption propriety judging unit 124, and a resumption command generating unit 126.

The command obtaining unit 100 obtains a command name from outside. As used herein, a command is intended to mean an instruction indicating a minimum unit process executed by the command executing apparatus 10. As used herein, the command name is intended to mean a command identifier. The command obtaining unit 100 obtains, for example, the command name of the command generated at an action planning device for planning an action of the mobile robot.

The command executing unit 102 executes the command distinguished by the command name obtained by the command obtaining unit 100. The command executing unit 102 also suspends the command in execution. When the command executing unit 102 suspends a command in execution, this stores information such as the command name of a suspended command or the like in the suspending command DB 110.

FIG. 2 shows examples of the command name obtained by the command executing unit 102. In FIG. 2, a state variable and command contents are further shown while being made to correspond to the command name. The state variable is a variable which relates to a state to which the command changes when executed. The command contents are executing contents of the command distinguished by the command name.

The command executing unit 102 holds a command table shown in FIG. 2. When the command executing unit 102 obtains the command name from the command obtaining unit 100, this specifies the command contents corresponding to an obtained command name at the command table, and executes specified command contents. In addition, this holds a state variable that are made to corresponded at the command table.

For example, the command executing unit 102 suspends the command in execution when obtaining the command name "suspend ( )." Further when obtaining the command name "delSuspendAll ( )," the command executing unit 102 deletes the suspending command held in the suspending command DB 110.

Further when obtaining the command name "explain (explanatory_position, explanatory_sentence)," the command executing unit 102 reads out a predetermined "explanatory_sentence" at a predetermined "explanatory_position." A sentence already read out is held as the state variable in this command. Therefore, the command executing unit 102 holds the state variable each time this executes the command. That is, the command executing unit 102 holds the number of sentences as the state variable read out each time the read out of the sentence is completed.

The number of state variables, which are made to correspond to one command name, may be one or two or more. Further, the command contents, which are made to correspond to one command name, may be one or two or more.

FIG. 3 shows a data structure of a delete condition table held in the delete condition holding unit 104. A symbol "*" in the drawing indicates an optional value. The delete condition holding unit 104 holds a delete condition while making this correspond to the command name. As used herein, the delete condition is intended to mean a condition for deleting the command from the suspending command DB 110 after making the suspending command DB 110 hold the command. The command deleted from the suspending command DB 110 is not resumed from a point at which the command is suspended, but is executed from a beginning of the command.

The delete condition, which is made to correspond to one command name, may be one or two or more. When the command executing unit 102 suspends the execution of the command, the delete condition generating unit 106 extracts the delete condition corresponding to the suspended command at the delete condition table held in the delete condition holding unit 104.

For example, six delete conditions are made to correspond to the command name "explain (A, an)." Therefore, when storing the command name "explain (A, an)" in the suspending command DB 110, the delete condition generating unit 106 extracts the six delete conditions corresponding to the command name "explain (A, an)" at the delete condition holding unit 104, and makes the suspending command DB 110 hold the six conditions as the delete condition of the command name "explain (A, an)" while making the conditions correspond to the command name. In this way, the deleting condition generating unit 106 can generate a delete condition relative to each command by referring the delete condition holding unit 104 based on the command name.

When the deleting condition according to this embodiment is not satisfied, the command held in the suspending command DB 110 is not deleted. That is, if the deleting condition is not satisfied, this means that a condition for resuming the command from the point at which the command is suspended is satisfied. The delete condition generating unit 106 and the delete condition holding unit 104 according to this embodiment may be referred to as a resume condition generating unit and a resume condition holding unit, respectively.

When the command executing unit 102 suspends the execution of the command, the executed contents generating unit 108 generates executed contents indicating process contents executed until command is suspended based on the state variable. Herein, the executed contents are intended to mean information of a state of a robot at a point at which the command is suspended, that is, a suspending state.

For example, if the explanatory sentence of the command name "explain (A, an)" is from "a1" to "an" and when the explanation up to "a3" is completed, the unit 108 generates the information indicating that the explanation up to "a3" is completed as the executed contents.

FIG. 4 shows a data structure of the suspending command DB 110. The suspending command DB 110 holds the command name of the suspending command suspended by the command executing unit 102, the delete condition generated by the delete condition generating unit 106, and the executed contents generated by the executed contents generating unit 108, while making them correspond to each other.

When the command the command name of which is "explain (A, an)" is suspended, the command name "explain (A, an)" is stored in the suspending command DB 110, as shown in FIG. 4. Further the six delete conditions and one executed contents are stored while making them correspond to the command name "explain (A, an)".

As used herein, the six delete conditions are intended to mean the delete condition corresponding to the command name "explain (A, an)" in FIG. 3. Further the executed contents is intended to mean information generated based on a state variable "number of sentences explained" corresponding to the command name "explain (A, an)."

Now, it will be described in reference to FIG. 2 again. The suspending command deleting unit 112 deletes the suspending command stored in the suspending command DB 110 according to the command executed by the command executing unit 102. Specifically, when the command executed by the command executing unit 102 satisfies the delete condition held in the suspending command DB 110, the unit 112 deletes all command name which is made to correspond to the delete condition, other delete condition, and the executed contents.

The resumption propriety judging unit 124 judges whether the suspending command held in the suspending command DB 110 can be resumed or not. Specifically, when the command, which is a target of resumption, is stored in the suspending command DB 110, the resumption propriety judging unit 124 judges that the command can be resumed.

On the other hand, the external state obtaining unit 120 obtains an external state which is information indicating the external state of the mobile robot. As used herein, the external state is intended to mean information such as a present position, a date and time, and a temperature of the mobile robot, for example.

The resumption command holding unit 122 holds the resumption command table in which the command name, the executed contents and a resumption command are made to correspond to each other. The resumption command generating unit 126 obtains the information about the suspending command judged to be resumed, from the suspending command DB 110, when the resumption propriety judging unit 124 judges the suspending command to be resumed. Further, the unit 126 generates the resumption command based on the information held in the resumption command holding unit 122 and the external state obtained by the external state obtaining unit 120.

FIG. 5 shows a data structure of the resumption command table held in the resumption command holding unit 122. The resumption command generating unit 126 extracts the command name of the suspending command judged to be resumed and the executed contents made to correspond to the command name, from the suspending command DB 110. Further the unit 126 extracts the resumption command, which is made to correspond to the extracted command name and the executed contents which are extracted at the resumption command table of the resumption command holding unit 122. In this way, the resumption command generating unit 126 generates the resumption command by using the information held in the resumption command holding unit 122.

In addition, the resumption command generating unit 126 refers to the external state obtained by the external state obtaining unit 120 and properly corrects the executed contents obtained by the suspending command DB 110. When the executed contents are corrected, the unit 126 generates the resumption command based on corrected executed contents. The resumption command generated by the resumption command generating unit 126 is executed by the command executing unit 102.

For example, suppose that the resumption command generating unit 126 extract the executed contents "moves by y" from the suspending command DB 110. At this time, the unit 126 obtains the present position of the mobile robot as the external state from the external state obtaining unit 120, and calculates a distance the mobile robot moves also from the present position of the mobile robot. When the present position of the mobile robot is found to be a position that "moves by y'," the unit 126 corrects the executed contents to be "moves by y'."

When a person moves the mobile robot while suspending the command, for example, the present position of the mobile robot may differ from the position at the time of suspending the command. In this case, more proper resumption command may be generated by referring the external state and correcting the executed contents.

While one resumption command is made to correspond to one command name in an example shown in FIG. 5, resumption commands may be made to correspond to a plurality of executed contents in one command, when the resumption commands differ from each other according to the executed contents.

Figure 6:
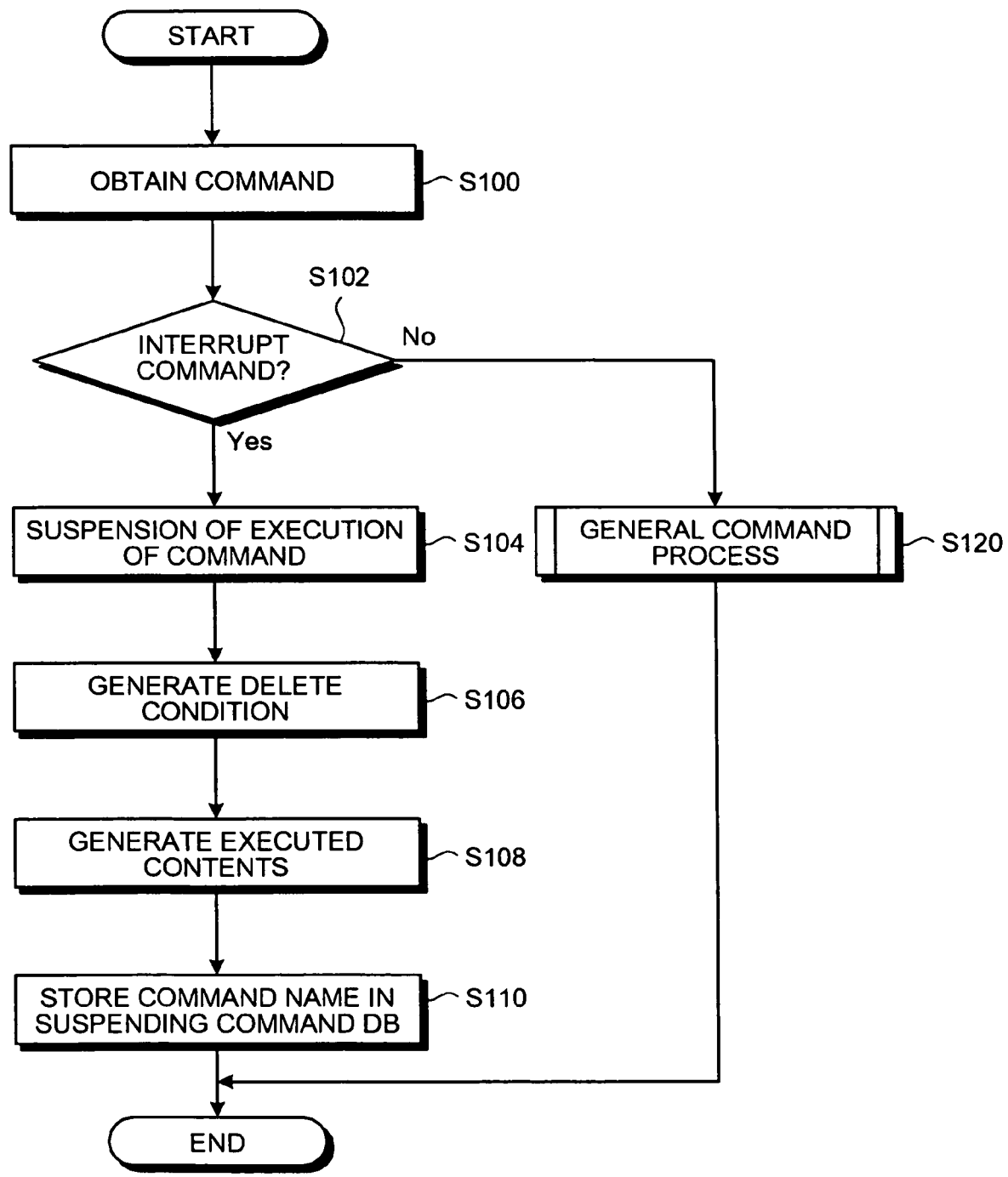
FIG. 6 is a flowchart showing a command executing method in the command executing apparatus.

FIG. 6 is a flowchart showing a command executing method at the command executing apparatus 10. The command obtaining unit 100 of the command executing apparatus 10 first obtains the command (step S100). Next, the command executing unit 102 judges whether the command obtained by the command obtaining unit 100 is an interrupt command or not. When the command is the interrupt command (step S102, Yes), the command executing unit 102 suspends execution of the command in execution (step S104). The command is judged whether the interrupt command by the command name. The command name "suspend ( )" in the command names shown in FIG. 2 is the command name of the interrupt command. That is, the command executing unit 102 judges the command to be the interrupt command when obtaining the command name "suspend ( )".

In addition, the delete condition generating unit 106 refers to the delete condition table held in the delete condition holding unit 104 to generate the delete condition (step S106). Further the executed contents generating unit 108 generates the executed contents indicating the contents executed by the command executing unit 102 until the command executing unit 102 obtains the interrupt command (step S108). Next, the command name, the delete condition, and the executed contents of the suspending command are made to correspond to each other and are stored in the suspending command DB 110 (step S110). Then, the command executing method is completed.

Figure 7:
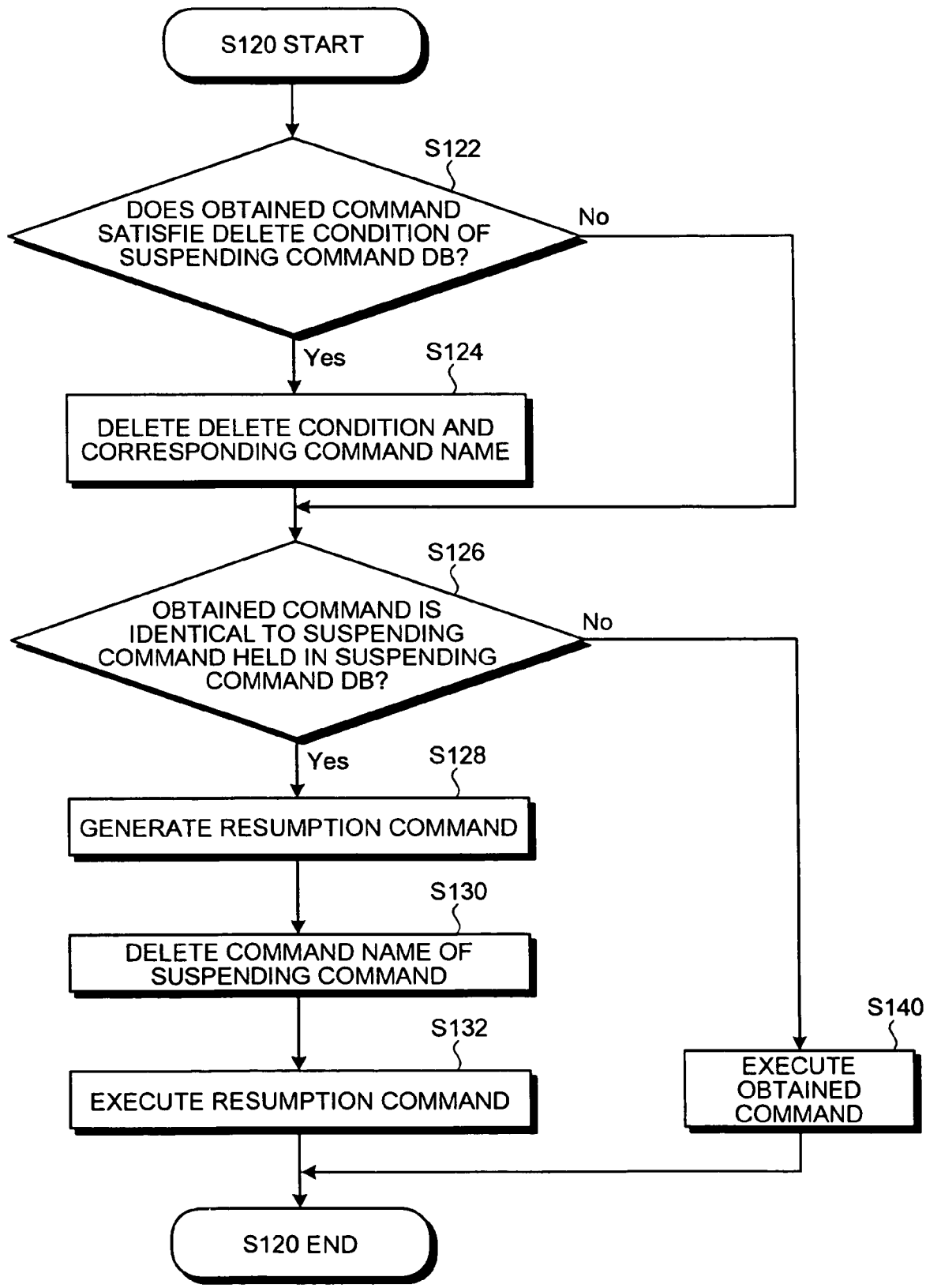
FIG. 7 is a flowchart showing a general command process.

On the other hand, when the command obtained at the step S102 is not the interrupt command, a general command process is performed (step S120). FIG. 7 is a flowchart showing the general command process.

When obtaining the command other than the interrupt command, the suspending command deleting unit 112 compares an obtained command and the delete condition held in the suspending command DB 110. If the obtained command satisfies the delete condition (step S122, Yes), the suspending command deleting unit 112 deletes the delete condition, the command name corresponding to the delete condition, other delete condition, and the executed contents (step S124). On the other hand, if the obtained command does not satisfy the delete condition at the step S122 (step S122, No), the operation shifts to the step S126.

In addition, the resumption propriety judging unit 124 judges whether the obtained command is identical to the suspending command held in the suspending command DB 110. If the obtained command is identical to the suspending command, the suspending command is resumed by the obtained command. When the obtained command is identical to the suspending command, that is, the obtained command is the resumption command (step S126, Yes), the resumption propriety judging unit 124 judges that the suspending command held in the suspending command DB 110 can be resumed from the point at which the command is suspended. The resumption command generating unit 126 generates the resumption command (step S128).

Next, the resumption propriety judging unit 124 deletes the information about the suspending command judged to be resumed from the suspending command DB 110 (step S130). Further the command executing unit 102 executes the resumption command generated by the resumption command generating unit 126 (step S132). Then the general command process is completed.

In this way, if the command obtained by the command obtaining unit 100 is identical to the suspending command held in the suspending command DB 110, the suspending command can be resumed from the point at which the execution of the command is suspended based on the executed contents held in the suspending command DB 110.

On the other hand, if the obtained command is not identical to the suspending command held in the suspending command DB 110 at the step S126, (step S126, No), the command executing unit 102 executes the obtained command (step S140). Then the command process is completed.

As described above, the suspending command held in the suspending command DB 110 is deleted from the suspending command DB 110 if the command obtained later satisfies the delete condition. Therefore, if the same command is obtained after deletion, the command executing unit 102 does not resume the execution from the point at which the execution of the command is suspended, but executes the process from a beginning thereof. That is, it is possible to automatically choose whether to execute the suspending command from the point at which the command is suspended or to execute the command from the beginning thereof on the basis that the delete condition is satisfied or not.

Furthermore, if the suspending command is resumed from the point at which the execution of the command is suspended, not only the suspending command is executed from halfway, but also the resumption command is newly generated, so that the suspending command is executed more smoothly. Hereinafter, a process of the command executing apparatus 10 when the command shown in FIG. 8 is obtained will be described concretely. When the command shown in FIG. 8 is obtained, the suspending command shall not be held in the suspending command DB 110.

As shown in FIG. 8, the command name "explain (A, an)" is first obtained (step S100). Since the obtained command is not the interrupt command (step S102, No), the operation shifts to the step S120.

At this moment, the command is not held in the suspending command DB 110. So, the delete condition is not satisfied (step S122, No). Therefore, the command executing unit 102 executes the obtained command (step S140). That is, the command executing unit 102 sequentially explains the explanatory sentences from "a1" to "an" at a position A.

Next, the command name "suspend ( )" shown in order of acquisition 2 (step S100) is obtained, while the command executing unit 102 explains the explanatory sentence "a4." Since the command is the interrupt command (step S102, Yes), the execution of the command name "explain (A, an)" is suspended (step S104).

Further, the six delete conditions corresponding to the command name "explain (A, an)" are extracted at the delete condition table held in the delete condition holing unit 104 (step S106). Furthermore, the executed contents generating unit 108 generates the executed contents "the explanation up to a3 is completed" based on the state variation (step S108). Further, the unit 108 stores the delete condition and the executed contents in the suspending command DB 110 while making them correspond to the command name "explain (A, an)" (step S110).

After obtaining the interruption command, the command name "speak (answer)" shown in an order of acquisition 3 is obtained (step S100). Since the command is not the interrupt command (step S102, No), the operation shifts to the step S120. In addition, the suspending command held in the suspending command DB 110 does not satisfy the delete condition of the command name "explain (A, an)" (step S122, No), or is not identical the suspending command held in the suspending command DB 110 (step S126, No). Therefore, the command executing unit 102 executes the command name "speak (answer)" (step S140).

Next, the command name "explain (A, an)" shown in an order of acquisition 4 is obtained again (step S100). Since the command is not the interrupt command (step S102, No), the operation shifts to the step S120. Furthermore, since the command name "explain (A, an)" does not satisfy the delete condition of the suspending command held in the suspending command DB 110 (step S122, No), the operation shifts to the step S126.

The command obtained in the order of acquisition 4 is identical to that obtained in the order of acquisition 1 and held in the suspending command DB 110 (step S126, Yes). Therefore, the resumption command is generated (step S128). That is, the command is resumed from the point at which the execution of the command is suspended.

At that moment, the suspending command is "explain (A, an)," and the executed contents "the explanation up to a3 is completed" are held. Therefore, the resumption command generating unit 126 generates the resumption commands "speak ("continuation of a previous speech")" and the "explain (A, a4)" based on the resumption command table as described above in reference to FIG. 5.

Next, the suspending command deleting unit 112 deletes information about the suspending command "explain (A, an)" from the suspending command DB 110 (step S130). Further the command executing unit 102 executes the resumption command (step S132).

Next, while the command executing unit 102 explains "a9," the command name in an order of acquisition 5 "suspend ( )" is obtained (step S100). Since the command is the interrupt command (step S102, Yes), the execution of the "explain (A, an)" is suspended (step S104), and the deleting condition and the executed contents are generated (step S106, step S108). Further the suspending command DB 110 is made to hold the command name, the delete condition, and the executed contents while making them correspond to each other (step S110).

Next, the command name "move (B)" shown in the number of acquisition 6 is obtained (step S100). Since the command is not the interrupt command (step S102, No), the operation shifts to the step S120. The command name "move (B)" satisfies the delete condition "move (*)" corresponding to the command name "explain (A, an)" (step S122, Yes). Therefore, the suspending command deleting unit 112 deletes the command name, other delete condition, and the executed contents corresponding to the delete condition "move (*)" (step S124). That is, the command "explain (A, an)" and information corresponding to the same are deleted.

Since the obtained command "move (B)" is not identical to the suspending command held in the suspending command DB 110 (step S126, No), the command executing unit 102 executes the command "move (B)" (step S140).

In the process relative to the command "move (B)," the command "explain (A, an)" is deleted from the suspending command DB 110. Therefore, the next time the command "explain (A, an)" is obtained, the command executing unit 102 resumes the command "explain (A, an)" not from the point at which the execution of the command is suspended but from the beginning thereof.

Hereinafter, the process of the command executing apparatus 10 when this obtains the command shown in FIG. 9, will be concretely described. When the command shown in FIG. 9 is obtained, the suspending command shall not be held in the suspending command DB 110.

The command name "move (B)" is first obtained, as shown in FIG. 9 (step S100). Since the command is not the interrupt command (step S102, No), the operation shifts to step S120. Since the command is not held in the suspending command DB 110, the delete condition is not satisfied (step S122, No). Further the command is not identical to the command held in the suspending command DB 110 (step S126, No). Therefore, the command executing unit 102 executes the obtained command (step S140). That is, movement to a point B is started.

Next, on the halfway to the point B, at a position with coordinate (x, y), that is, the position with a remaining path α to the point B, the command name "suspend ( )" shown in the order of acquisition 2 is obtained (step S100). Since the command is the interrupt command (step S102, Yes), the execution of the command "move (B)" is suspended (step S104).

Then, five delete conditions, which are made to correspond to the command "move (B)", are extracted at the delete condition table held in the delete condition holding unit 104 (step S106). Furthermore, the executed contents generating unit 108 generates an executed contents 1 "position with coordinate (x, y)" and the executed contents 2 "remaining path a" based on the state variable (step S108). Next, the suspending command DB 110 is made to hold the delete condition and the executed contents while making them correspond to the command name "move (B)" (step S110).

Next, the command name "wait (T)" is obtained (step S100). Since the command is not the interrupt command (step S102, No), the operation shifts to the step S120. Since the command neither satisfies the delete condition of the suspending command "move (B)" stored in the suspending command DB 110 (step S122, No), nor is not identical to the suspending command held in the suspending command DB 110 (step S126, No), the command execution unit 102 executes the command "wait (T)" (step S140). That is, the apparatus keeps sleep state for t seconds.

After t seconds have elapsed, the command name "suspend ( )" in order of acquisition 4 is obtained (step S100). Since the command is the interrupt command (step S102, Yes), the execution of the command name "wait (T)" is suspended (step S104). Further the delete condition corresponding to the command name "wait (T)" at the delete condition table held in the delete condition holding unit 104 is extracted (step S106). Herein, an extracted delete condition "*" indicates all the commands. That is, the next time the command is obtained, the information about to the command name "wait (T)" is deleted. Furthermore, the executed contents generating unit 108 generates the executed contents 1 "t seconds have elapsed" based on the state variable (step S108).

Next, the command name "move (B)" in order of acquisition 4 is obtained (step S100). Since the command is not the interrupt command (step S102, No), the operation shifts to the step S120. Furthermore, since the command "move (B)" satisfies the delete condition of the suspending command "wait (T)" held in the suspending command DB 110 (step S122, Yes), the information about to the command "wait (T)" is deleted from the suspending command DB 110 (step S124).

Furthermore, the suspending command "move (B)" stored before the command "wait (T)" is held in the suspending command DB 110, and since the command "move (B)" is identical to the command "move (B)" (step S126, Yes), the resumption command is generated (step S128). That is, the command is resumed from the point at which the execution of the suspended command is suspended.

The suspending command is "move (B)", and the executed contents 1 "position with coordinate (x, y)" and the executed contents 2 "remaining path α" are made to correspond to the command are held in the suspending command DB 110. Therefore, the resumption command "move (B, (x, y), path α)" is generated based on the resumption command table described in reference to FIG. 5. Next, the suspending command deleting unit 112 deletes the information about the suspending command "move (B)" from the suspending command DB 110 (step S130). Then the command executing unit 102 executes the resumption command (step S132).

Figure 10:
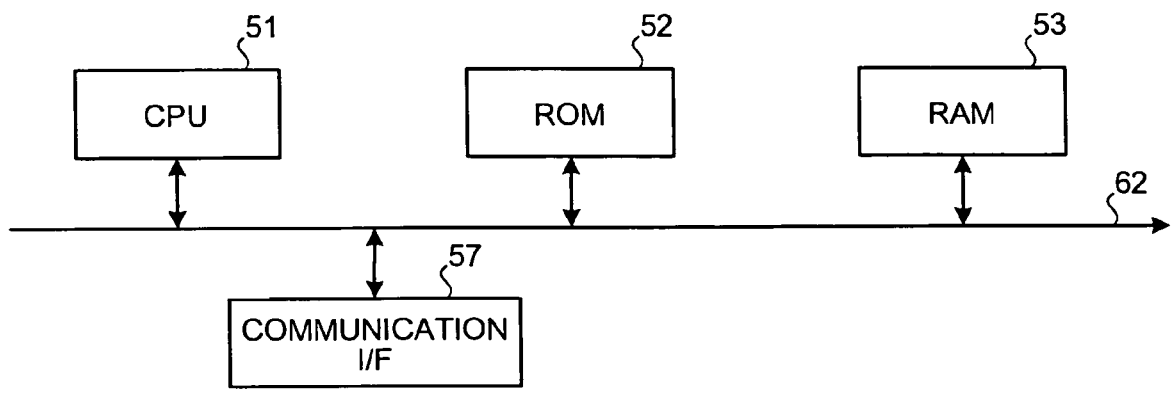
FIG. 10 is a block diagram of a hardware structure of the command executing apparatus according to the embodiment.

FIG. 10 is a block diagram of a hardware structure of the command executing apparatus 10 according to the embodiment. The command executing apparatus 10 comprises as a hardware structure, a ROM 52 in which a command executing program for executing a command executing method at the command executing apparatus 10, a CPU 51 for controlling each unit of the command executing apparatus 10 according to the program in the ROM 52, a RAM 53 for storing a variety of data necessary for controlling the command executing apparatus 10, communication I/F for communicating by connecting to a network, and a bus 62 for connecting each unit.

The command executing program in the above-described command executing apparatus 10 may be stored in a computer-readable recording media such as a CD-ROM, a floppy (registered trademark) disk (FD), a DVD or the like to be provided as a file capable of being installed or executed.

In this case, the command executing program is read from the above-described recording media and executed at the command executing apparatus 10 to be loaded, and each unit explained in the above-described software structure is generated on the main memory.

Further, the command executing program according to this embodiment may be stored on the computer connected to a network such as the Internet or the like, to be provided by being downloaded through the network.

While the invention has been described with reference to the embodiment thereof, various other modifications and improvements may be made in the above-described embodiment.

While the suspending command is judged whether to be deleted on the basis that whether the delete condition for deleting the suspending command is satisfied or not in this embodiment, the suspending command may be judged whether to be deleted on the basis that whether this satisfies the resumption condition for not deleting the suspending condition, which is a condition for resuming the suspending condition.

Specifically, contents opposite to the deleting condition are generated as the resuming condition. Further when the resumption condition is satisfied, the suspending command is judged not to be deleted. That is, the suspending condition is judged to be resumed from the point at which the suspending command is suspended.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A command executing apparatus comprising:
a command obtaining unit that obtains a command indicating process contents of a robot;
an executing unit that executes the command;

a suspending unit that suspends execution of the command, when an interrupt command indicating suspension of the execution of the command being executed by the executing unit is obtained;

a resumption condition generating unit that generates a resumption condition for resuming a suspending command based on the suspending command, which is the command suspended by the suspending unit;

an executed contents generating unit that generates executed contents which is information indicating the process contents executed until the suspending command is suspended;

a suspending state holding unit that holds a resumption command and the executed contents in association with the suspending command;

a resumption propriety judging unit that judges whether the suspending command is able to be resumed, based on the command obtained by the command obtaining unit from a point at which the execution of suspending command is suspended to a point at which a resumption command is obtained and the resumption condition held by the suspending state holding unit, when the resumption command indicating resumption of the suspending command is obtained;

a resumption command generating unit that generates the resumption command, which should be executed when the suspending command is resumed, based on the executed contents held by the suspending state holding unit, when the suspending command is judged to be able to be resumed; and a resuming unit that indicates to the executing unit that the resumption command is to be executed.

2. The command executing apparatus according to claim 1, wherein the resumption condition generating unit generates the resumption condition indicating an execute command to be executed after the suspending command is held in the suspending state holding unit, and the resumption propriety judging unit judges the suspending command held by the suspending state holding unit to be able to be resumed, when the execute command indicated in the resumption condition is identical to the command to be executed after the execution of the command is suspended.

3. The command executing apparatus according to claim 2, further comprising a deleting unit that deletes the resumption condition, the suspending command, and the executed contents from the suspending state holding unit, when the execute command indicated in the resumption condition is identical to the command to be executed after the execution of the command is suspended, wherein the resumption propriety judging unit judges that the suspending command corresponding to the resumption condition, the suspending command, and the executed contents, which are deleted by the deleting unit, are not able to be resumed.

4. The command executing apparatus according to claim 1, wherein the resumption propriety judging unit judges a command to be a resumption command, when the command identical to the suspending command is obtained.

5. The command executing apparatus according to claim 1, further comprising a resumption condition holding unit that holds the suspending command and the resumption condition in association with each other, wherein the resumption condition generating unit obtains the resumption condition associated with the suspending command at the resumption condition holding unit, as the resumption condition relative to the suspending command.

6. The command executing apparatus according to claim 1, further comprising a resumption command holding unit that holds the executed contents and the resumption command in association with each other, wherein the resumption command generating unit obtains the resumption command associated with the executed contents at the resumption command holding unit as the resumption command relative to the execute command.

7. The command executing apparatus according to claim 6, further comprising a state information obtaining unit that obtains state information indicating a state of a target object to be an executing target of the command, wherein the resumption command generating unit further generates the resumption command based on the state information obtained by the state information obtaining unit.

8. A command executing method comprising:

obtaining a command indicating process contents of a robot;

executing the command;

suspending execution of the command, when an interrupt command indicating suspension of execution of the command in execution is obtained;

generating a resumption condition for resuming a suspending command based on the suspending command which is the command suspended;

generating executed contents which is information indicating process contents executed until the suspending command is suspended;

holding in a suspending state holding unit the resumption condition and the executed contents in association with the suspending command;

judging whether the suspending command held by the suspending state holding unit is to be able to be resumed based on the command obtained from a point at which execution of the suspending command is suspended to a point at which the resumption condition is obtained and the resumption condition held by the suspending state holding unit, when the resumption command indicating resumption of the suspending command is obtained;

generating the resumption command, which should be executed when the suspending command is resumed, based on the executed contents held by the suspending state holding unit, when the suspending command is judged to be able to be resumed; and executing the resumption command.

9. A computer program product having a computer readable recording medium including programmed instructions for executing a computer-executable command, wherein the instructions, when executed by a computer, cause the computer to perform:

obtaining a command indicating process contents of a robot;

executing the command;

suspending execution of the command, when an interrupt command indicating suspension of execution of the command in execution is obtained;

generating a resumption condition for resuming a suspending command based on the suspending command which is the command suspended;

generating executed contents which is information indicating process contents executed until the suspending command is suspended;

holding in a suspending state holding unit the resumption condition and the executed contents in association with the suspending command;

judging whether the suspending command held by the suspending state holding unit is to be able to be resumed based on the command obtained from a point at which execution of the suspending command is suspended to a point at which the resumption condition is obtained and the resumption condition held by the suspending state holding unit, when the resumption command indicating resumption of the suspending command is obtained;

generating the resumption command, which should be executed when the suspending command is resumed, based on the executed contents held by the suspending state holding unit, when the suspending command is judged to be able to be resumed; and executing the resumption command.

* * * * *